United States Patent [19]
Lobunez et al.

[11] 4,083,939
[45] Apr. 11, 1978

[54] USE OF TRIBUTOXYETHYLPHOSPHATE TO CONTROL FOAM IN THE PRODUCTION OF SODA ASH FROM TRONA

[75] Inventors: Walter Lobunez, Princeton; Joseph M. Ilardi, South Brunswick; R. Martin Wright, East Brunswick, all of N.J.; Allan P. Herring, Green River, Wyo.

[73] Assignee: FMC Corporation, Philadelphia, Pa.

[21] Appl. No.: 779,958

[22] Filed: Mar. 22, 1977

Related U.S. Application Data

[63] Continuation of Ser. No. 765,148, Feb. 3, 1977, abandoned.

[51] Int. Cl.$^2$ .......................... C01D 7/00; B01D 19/02
[52] U.S. Cl. ...................................... 423/421; 23/300; 23/302 T; 203/20; 252/321; 423/206 T
[58] Field of Search ................. 423/206 T, 421, 265, 423/266; 252/321; 203/20; 23/295, 298, 300, 302 T

[56] References Cited

U.S. PATENT DOCUMENTS

| | | | |
|---|---|---|---|
| 2,411,671 | 11/1946 | Smith et al. | 252/321 |
| 2,777,807 | 1/1957 | Pyle et al. | 252/321 |
| 2,792,374 | 5/1957 | Bradley et al. | 252/321 |
| 3,341,467 | 9/1967 | Hwa | 252/321 |
| 3,399,144 | 8/1968 | Hathaway et al. | 252/321 |
| 3,595,968 | 7/1971 | Groves | 252/321 |
| 3,725,014 | 4/1973 | Poncha et al. | 423/206 T |

FOREIGN PATENT DOCUMENTS

| | | | |
|---|---|---|---|
| 526,690 | 9/1940 | United Kingdom | 252/321 |

OTHER PUBLICATIONS

Hopper; T. R., TBEP:Multifunctional Agent for Latex Paints, American Paint Journal, 1970, 54(54), pp. 18, 20-21, 24.

Ross et al., Inhibition of Foaming in Solvent Containing Known Foamers, HEC vol. 36, No. 6, June 1944, pp. 570-573.

U.S. Trademark Registration 823251, Jan. 31, 1967.

*Primary Examiner*—O. R. Vertiz
*Assistant Examiner*—Gary P. Straub
*Attorney, Agent, or Firm*—R. D. Jackson

[57] ABSTRACT

Tributoxyethylphosphate is useful in controlling foam produced during the evaporative crystallization of calcined trona solutions. The chemical is effective at low concentrations, i.e. 1 to 30 ppm, and does not significantly alter the crystal habit of the sodium carbonate crystals.

3 Claims, No Drawings

USE OF TRIBUTOXYETHYLPHOSPHATE TO CONTROL FOAM IN THE PRODUCTION OF SODA ASH FROM TRONA

CROSS REFERENCE TO RELATED APPLICATION

This is a continuation of application Ser. No. 765,148, filed Feb. 3, 1977, now abandoned.

This invention relates to the production of soda ash from trona. More particularly, the invention pertains to the suppression of foaming in the trona processing liquors.

Soda ash, known chemically as anhydrous sodium carbonate, is an important industrial commodity which finds extensive application in glass making and other commercial processes. Although still produced by the Solvay process, the trend in recent years is to obtain soda ash from trona ore which is principally sodium sesquicarbonate ($Na_2CO_3 \cdot NaHCO_3 \cdot 2H_2O$). A typical trona assay runs as follows:

| | |
|---|---|
| $Na_2CO_3$ | 43.51% |
| $NaHCO_3$ | 36.11% |
| $H_2O$ | 13.14% |
| NaCl | 0.08% |
| $Na_2SO_4$ | 0.02% |
| $Fe_2O_3$ | 0.14% |
| Organic Matter | 0.30% |
| Insolubles | 6.70% |
| | 100.00% |

Two basic commercial processes have been worked out for extracting soda ash from trona.

In the sesqui process, the trona is dissolved in water, the insolubles and organic matter removed and the leach solution crystallized to give sodium sesquicarbonate, which may be used as such or subsequently calcined to soda ash. In the monohydrate process, described in U.S. Pat. No. 2,962,348 to Seglin et al. and with which the present invention is concerned, the crushed trona ore is calcined at the beginning, the calcined material dissolved, the solution freed of insolubles and the resulting leach solution purified, preferably by passage through columns of activated carbon. From the purified filtrate, there is formed crystalline sodium carbonate monohydrate which is separated from the mother liquor and heated to about 105°–125° C to drive out water of hydration and give anhydrous sodium carbonate or soda ash. The crystallization is carried out in large evaporator-crystallizer assemblies placed in parallel. Each of the evaporators, however, is under different pressure and temperature conditions, and the heat from a high temperature evaporator (the first effect evaporator) is utilized for evaporating water from the next lower temperature evaporator.

During the evaporation-crystallization operation aforesaid, severe foaming often occurs, apparently due to residual impurities still present in the refined sodium carbonate solution. In any event, there is considerable foam and solution carry over with the water being evaporated resulting in such multiple problems as corrosion, scaling and diminished heat transfer. In cases of severe foaming, the evaporators have to be emptied and refilled with fresh feed; this leads to severe alkali losses and consequent economic penalties.

Attempts have been made to control foam in soda ash evaporators by means of anti-foam agents. Although numerous foam inhibitory materials are known, none of these have proved entirely successful. Many of the commercial anti-foam agents are not stable in the hot alkaline trona solution and often break down into substances which actually increase foaming. Moreover, the presence of anti-foamers or their decomposition products often deleteriously effect the crystalline habit of the sodium carbonate monohydrate engendering an unsatisfactory final soda ash product. Anti-foamers can also interfere with or displace the crystal modifiers which are commonly added to refined trona solutions to produce soda ash having predictable physical specifications such as certain bulk density, size distribution, frangibility and the like.

It has now been discovered that the formation of foam during the evaporative crystallization of aqueous sodium carbonate to produce sodium carbonate monohydrate crystals can be suppressed or otherwise controlled with minimal side effects by carrying out the evaporative crystallization in the presence of an effective amount of tributoxyethylphosphate.

The amount of tributoxyethylphosphate which may be incorporated in the aqueous carbonate solution to suppress foaming is generally within the range of about 1 to 30 parts per million (ppm). Levels in excess of 30 ppm while effective, are not necessary and add to the cost of plant operation. Tributoxyethylphosphate is a well known, commercially available chemical.

The tributoxyethylphosphate herein prevents foaming during evaporation-crystallization of the sodium carbonate solution at temperatures of from about 25° C to about 110° C.

In producing soda ash via the sodium carbonate monohydrate process, aqueous sodium carbonate in the form of a trona ore calcinate solution, typically at least about 27% by weight, which has been clarified and filtered is passed through crystallization units, typically multiple effect evaporator crystallizers. Normally, three crystallizers designed in the known manner receive the sodium carbonate solution which is fed in parallel through the crystallizers and the sodium carbonate monohydrate, which is continuously formed, removed from the crystallizers. Condensate from the first crystallizer, operated at the highest temperature (first effect) is utilized as a heat source for the next (second effect) crystallizer maintained at a lower temperature than the first crystallizer. The effects are numbered in the direction of condensate flow. Sodium carbonate monohydrate slurry is withdrawn from the crystallizer, commonly by means of suitable pumps, and conveyed to the next processing stations where the monohydrate crystals are separated in the usual manner. The mother liquor is recycled back to the crystallizers. Preferably, the tributoxyethylphosphate herein is added to the sodium carbonate solution in anti-foaming effective amounts just prior to passing of the solution to the crystallizers wherein the sodium carbonate monohydrate crystals are produced. For a more detailed account of the crystallization of sodium carbonate monohydrate reference is made to U.S. Pat. Nos. 2,962,348 and 3,131,996 as well as the technical and patent literature, generally.

Foam Evaluation Procedure

In order to demonstrate the capacity of tributoxyethylphosphate for suppressing foam generated in calcined trona solutions, the following procedure was utilized.

Samples used were prepared by dissolving 100–300 g portions of crude calcined trona solution in 200–600 ml of distilled water at 90° C and then clarifying by settling the solids in a clarifier followed by filtering to remove the remaining small particles. The foam determinations were performed at 103° ± 1° C on 100 ml specimens of the refined solutions contained in 250 ml graduated cylinders in a thermostatically controlled bath. A sparger was inserted into a specimen solution and a measured flow of nitrogen started. The maximum foam rise over a prescribed interval, usually 10–15 minutes was recorded.

EXAMPLE I

This example serves as a blank in that it shows the amount of foam produced by carbonate solutions without the tributoxyethylphosphate of the invention. In carrying out this example, mixtures were prepared from the trona ore calcinate solution and distilled water in a weight ratio of 1:2 and then purified as described in the procedure aforesaid. The foam test was performed at 103° C on a 100 ml portion of the carbonate solution. The nitrogen flow rate was adjusted to 410 ml/minute at standard temperature and pressure (STP). The maximum foam volume was 190 ml at 15–30 minutes.

EXAMPLE II

The procedure of Example I was repeated except 1.7 ppm of tributoxyethylphosphate was added to the carbonate solution. The volume of foam amounts to 137 ml.

EXAMPLE III

The procedure of Example I was repeated except 10 ppm of tributoxyethylphosphate was added to the carbonate solution. The volume of foam was 25 ml.

EXAMPLE IV

Trona ore, which has been dry mined and crushed to approximately ¼ inch size, containing about 85–95% sodium sesquicarbonate, is calcined in a plant kiln at a temperature above 150° C. The resulting crude sodium carbonate is dissolved in water to give a carbonate process solution containing approximately 28–30% of sodium carbonate. This solution containing undissolved impurities is passed through a clarification system to remove grit and mud. The clarified process solution obtained is filtered and optionally treated with activated carbon and fed in parallel flow into the evaporator crystallizers. Three parallel crystallizers are used and represent three effects with respect to steam. The crystallizer system operates under partial vacuum conditions corresponding to boiling conditions of approximately 60°–106° C temperature conditions present in the three effects. The slurry that is being continuously formed in the evaporators as 30 to 40% sodium carbonate monohydrate crystals is continuously withdrawn from the evaporators, separated from the mother liquor and dehydrated in a fluid bed to form the final product anhydrous sodium carbonate. The mother liquor is recycled back to the crystallizers. A part of the mother liquor is purged. Foaming in the evaporator crystallizers is controlled by the addition thereto of 7–8 ppm of the tributoxyethylphosphate of the invention. Addition of 7–8 ppm of defoamer brought foaming under control.

What is claimed is:

1. In the evaporative crystallization of an aqueous sodium carbonate solution to produce sodium carbonate monohydrate, the improvement of reducing foaming which comprises carrying out the crystallization in the presence of an effective amount of tributoxyethylphosphate as an antifoaming agent.

2. The process according to claim 1 wherein the aqueous sodium carbonate is obtained by dissolving calcined trona in water, removing insolubles and purifying the resulting solution by treatment with activated charcoal.

3. The process according to claim 1 wherein the effective amount of tributoxyethylphosphate is from about 1 to about 30 parts per million.

* * * * *